(No Model.)
A. W. GETCHELL.
BUOYANT SCREW PROPELLER.
No. 512,186. Patented Jan. 2, 1894.
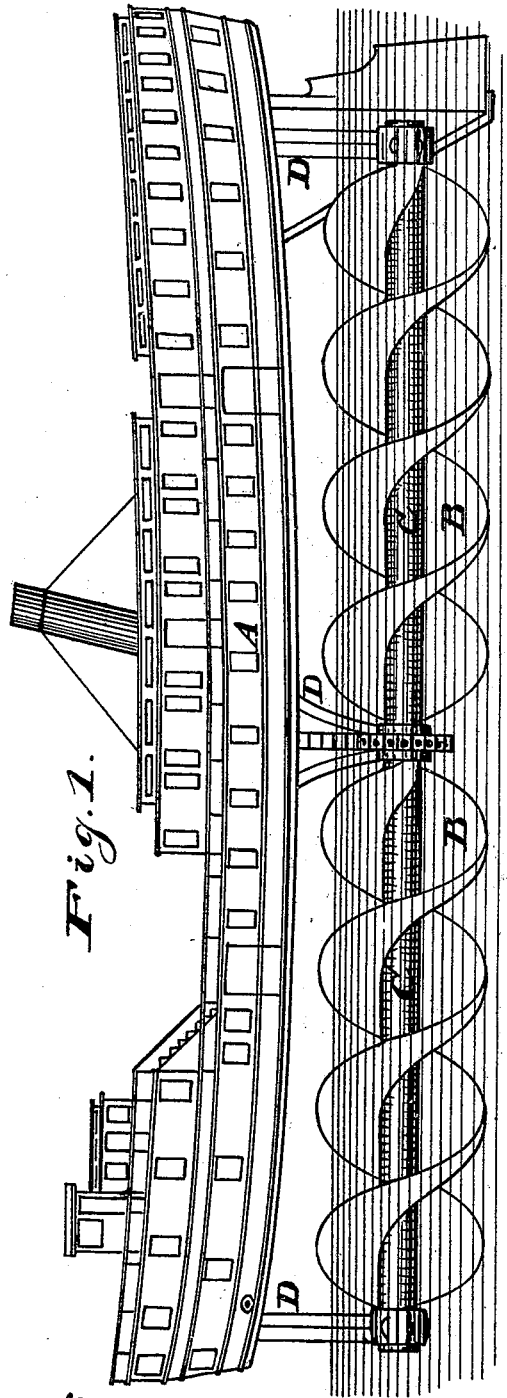
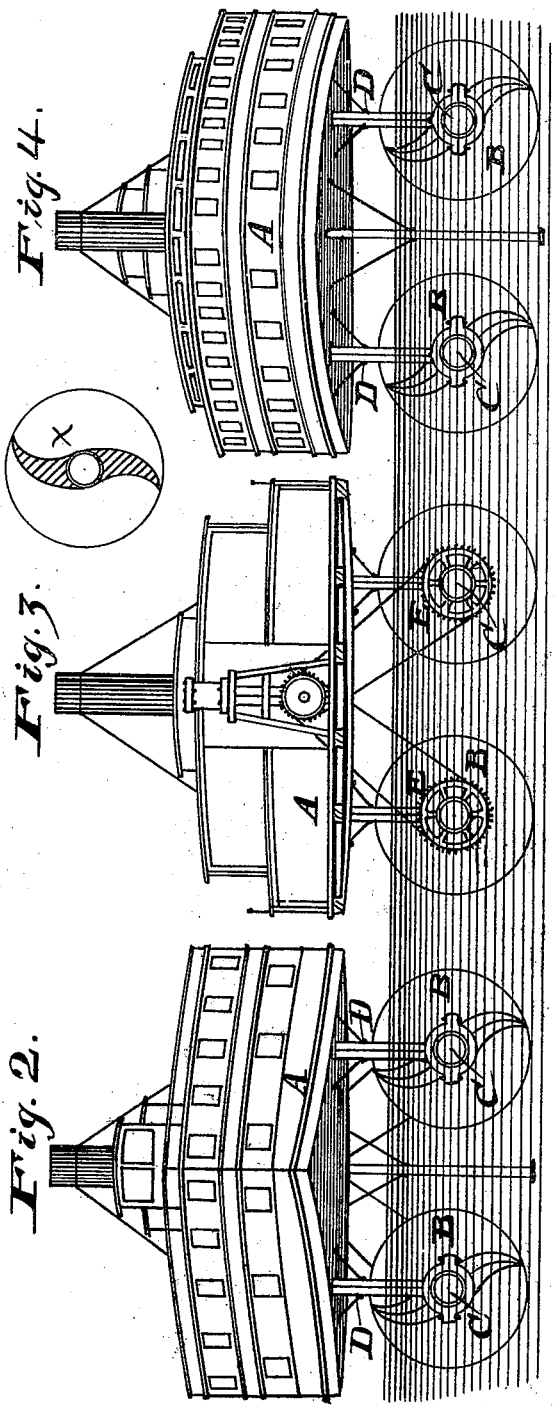
Witnesses.
C. M. Burttum.
John C. Talcott.
Inventor,
Augustus W. Getchell
by Geo. W. Tibbitts Atty.

UNITED STATES PATENT OFFICE.

AUGUSTUS W. GETCHELL, OF CLEVELAND, OHIO, ASSIGNOR OF ONE-HALF TO JOSEPH G. CHADWICK, OF SAME PLACE.

BUOYANT SCREW-PROPELLER.

SPECIFICATION forming part of Letters Patent No. 512,186, dated January 2, 1894.

Application filed June 12, 1893. Serial No. 477,384. (No model.)

*To all whom it may concern:*

Be it known that I, AUGUSTUS W. GETCHELL, of Cleveland, in the county of Cuyahoga and State of Ohio, have invented certain new and useful Improvements in Buoyant Screw-Propellers, of which the following is a specification.

This invention relates to buoyant screw propellers for water craft, and consists of buoyant screws constructed to float and bear the body of the craft above the surface of the water.

The object of the invention is to provide against the displacement of water common to all water craft, by providing buoyant screws, which take the place of the hull and are practically the hull of my boat, the screws being of proportionately large dimensions capable of supporting a good sized vessel-like superstructure above the water,—and which may be rapidly rotated for propulsion on the water, and speedily carrying the boat or vessel over the water with the least amount of resistance in and by the water, the screws working in the water in like manner to screws in their nuts. In ordinary steam and sailing vessels, the displacement of water becomes a strong resistance to their propulsion, and requires great power to overcome, consequently retards their progress, whereas in my device, the only displacement is by the screws, and in rotating them in the water the resistance is available for carrying them forward instead of retarding them, for the rotation of the screws tends to move them forward. The screws also roll very easily in the water, like the rolling of logs. The bearing down on one side of the axis of the screw is aided by the tendency of the other side to be lifted by the water, so that a minimum of power will serve to turn them. The buoyancy relied upon in my device is contained in the spiral blades of the screws, and not on air-chambers or the hollow or tubular shafts, as the shafts are entirely open so that the water may pass through them and thus present the least resistance to the passage of the screws through the water.

In the accompanying drawings, Figure 1 is a side elevation of a boat embodying my invention. Fig. 2 is a bow end elevation. Fig. 3 is a midship cross-section. Fig. 4 is a stern end elevation of the same.

A represents the main deck of a boat upon which is built all the upper structure of a freight or passenger boat. Beneath the said main deck there is no hull provided, but in substitution therefor, I construct and apply floating buoyant screws, B B, which support and carry the said upper structure above the surface of the water. From the under side of the deck A, are provided suitable hangers or brackets, D D D having bearings for the journals of the said screws. These screws consist of tubular shafts C, open at the ends so that water may pass through, upon which are constructed the spiral blades, which comprise the buoyant and propelling element in my invention. These spiral blades may be made of sheet metal broad at their base, or junction with the shafts and sharp at their circumferential edges, as shown in cross-section at X, and have a filling of cork or other suitable very light buoyant material. These screws may be made in a suitable number of sections as desired for convenience and strength of attachment, as the length of boat requires. Upon the shafts are provided sprocket or gear-wheels E, E, to which power may be applied by belts or other suitable means from an engine above the deck, substantially as shown in Fig. 3.

Having described my invention, I claim—

1. The buoyant screw propellers, consisting of hollow shafts, open at both ends for the free passage of water therethrough, and spiral buoyant blades mounted on said hollow shafts, substantially as described.

2. The combination of buoyant screw propellers, consisting of hollow open shafts C C, spiral buoyant blades B B, mounted on said hollow shafts, boat body A, hangers D, D, suspended from said boat and carrying the said shafts and buoyant screw blades, and means for giving rotary motion to said propellers, all constructed to operate substantially as described.

AUGUSTUS W. GETCHELL.

Witnesses:
GEO. W. TIBBITTS,
M. G. NORTON.